(12) United States Patent  
Livesley

(10) Patent No.: US 12,417,122 B2
(45) Date of Patent: *Sep. 16, 2025

(54) MEMORY ALLOCATION FOR 3-D GRAPHICS RENDERING

(71) Applicant: Imagination Technologies Limited, Kings Langley (GB)

(72) Inventor: Michael John Livesley, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,244

(22) Filed: Mar. 18, 2024

(65) Prior Publication Data

US 2024/0231914 A1 Jul. 11, 2024

Related U.S. Application Data

(63) Continuation of application No. 18/125,665, filed on Mar. 23, 2023, now Pat. No. 11,934,878.

(30) Foreign Application Priority Data

Mar. 30, 2022 (GB) ..................... 2204511

(51) Int. Cl.
*G06F 9/46* (2006.01)
*G06F 9/50* (2006.01)
(Continued)

(52) U.S. Cl.
CPC .............. *G06F 9/5016* (2013.01); *G06T 1/60* (2013.01); *G06T 15/005* (2013.01)

(58) Field of Classification Search
CPC .................................................... G06F 9/5016
See application file for complete search history.

(56) References Cited

U.S. PATENT DOCUMENTS 8,074,224 B1  12/2011  Nordquist et al.
8,330,766 B1  12/2012  McAllister et al.
(Continued)

FOREIGN PATENT DOCUMENTS

CN  105261066 A  1/2016
CN  109978751 A  7/2019
(Continued)

OTHER PUBLICATIONS

Anonymous; "Graphics—SGX543MP4"; Retrieved from the Internet: URL:https://www.psdevwiki.com/vita/Graphics; Sep. 13, 2020; pp. 1-9.

(Continued)

*Primary Examiner* — Gregory A Kessler
(74) *Attorney, Agent, or Firm* — Potomac Law Group, PLLC; Vincent M DeLuca

(57) ABSTRACT

A method and apparatus are provided for allocating memory for geometry processing in a 3-D graphics rendering system comprising multiple cores. Geometry processing work is divided up into discrete work-packages, which form an ordered sequence. Cores are assigned different work-packages to process, and make memory allocation requests to enable them to store the results of the processing. Memory allocation requests relating to the current earliest uncompleted work-package in the sequence are treated differently to other requests, and may be prioritised.

20 Claims, 8 Drawing Sheets

(51) Int. Cl.
*G06T 1/60* (2006.01)
*G06T 15/00* (2011.01)

(56) References Cited

U.S. PATENT DOCUMENTS

| | | | |
|---|---|---|---|
| 10,275,851 | B1 | 4/2019 | Zhao et al. |
| 2007/0091099 | A1 | 4/2007 | Zhang et al. |
| 2007/0159488 | A1 | 7/2007 | Danskin et al. |
| 2011/0109638 | A1 | 5/2011 | Duluk, Jr. et al. |
| 2011/0292032 | A1 | 12/2011 | Yang |
| 2015/0254102 | A1 | 9/2015 | Ueda et al. |
| 2016/0260249 | A1 | 9/2016 | Persson et al. |
| 2017/0178401 | A1 | 6/2017 | Agrawal et al. |
| 2017/0236244 | A1 | 8/2017 | Price et al. |
| 2017/0256016 | A1 | 9/2017 | Lee et al. |
| 2018/0130253 | A1 | 5/2018 | Hazel |
| 2018/0211435 | A1 | 7/2018 | Nijasure et al. |
| 2018/0276876 | A1 | 9/2018 | Yang et al. |
| 2018/0307490 | A1 | 10/2018 | Hakura et al. |
| 2019/0355084 | A1 | 11/2019 | Gierach et al. |
| 2020/0097293 | A1 | 3/2020 | Havlir et al. |
| 2020/0265547 | A1 | 8/2020 | Redshaw |
| 2020/0380755 | A1 | 12/2020 | Howson et al. |
| 2021/0097013 | A1 | 4/2021 | Saleh et al. |
| 2021/0158598 | A1 | 5/2021 | Bratt et al. |
| 2021/0241416 | A1 | 8/2021 | Cerny |
| 2022/0083384 | A1 | 3/2022 | Cerny |
| 2022/0319089 | A1 | 10/2022 | Nemlekar et al. |
| 2024/0005444 | A1 | 1/2024 | Stepuch |
| 2024/0070962 | A1 | 2/2024 | Yang et al. |
| 2024/0127524 | A1 | 4/2024 | Yang et al. |

FOREIGN PATENT DOCUMENTS

| | | | |
|---|---|---|---|
| CN | 112862661 | A | 5/2021 |
| EP | 1287494 | A1 | 3/2003 |
| EP | 2548171 | A1 | 1/2013 |
| EP | 3547248 | A1 | 10/2019 |
| EP | 3796263 | A1 | 3/2021 |
| EP | 3862975 | A1 | 8/2021 |
| GB | 2594764 | A | 11/2021 |
| WO | 2009068895 | A1 | 6/2009 |

OTHER PUBLICATIONS

Beets; "A look at the PowerVR graphics architecture: Tilebased rendering"; Retrieved from the Internet: URL: https://blog.imaginationtech.com/a-look-at-the-powervr-graphics-architecture-tile-based-rendering/; Apr. 2, 2015; pp. 1-12.

Beets; "A look at the PowerVR graphics architecture"; Retrieved from the Internet: URL:https://blog.imaginationtech.com/the-dr-in-tbdr-deferred-rendering-in-rogue/; Jan. 28, 2016; pp. 1-13.

Beets; "Introducing Furian: the architectural changes"; Retrieved from the Internet: URL:https://blog.imaginationtech.com/introducing-furian-the-architectural-changes/; Mar. 13, 2017; pp. 1-13.

Crisu et al; "Low-Power Techniques and 2D/3D Graphics Architectures"; Report Delft University of Technology; vol. Jan. 2001; Jun. 26, 2001; 139 pages.

Imagination Technologies: "Tiling positive or how Vulkan maps to PowerVR GPUs"; Retrieved from the Internet: URL: https%3A%2F%2Fblog.imaginationtech.com%2Ftiling-positive-or-how-vulkan-maps-to-powervr-gpus%2F; Mar. 9, 2016; pp. 1-13.

Kayhan; "Chasing Triangles in a Tile-based Rasterizer"; Retrieved from the Internet: URL:https://tayfunkayhan.wordpress.com/2019/07/26/chasing-triangles-in-a-tile-based•-rasterizer/; Jul. 29, 2019; pp. 1-18.

Ma; "Concepts and metrics for measurement and prediction of the execution time of GPU rendering commands"; Retrieved from the Internet: URL:https://elib.uni-stuttgart.de/bitstream/11682/3467/1/MSTR_3635.pdf; Aug. 19, 2014; pp. 1-99.

Nickolls et al; "Appendix C: Graphics and Computing GPU'S"; Computer Organization and Design: The Hardware/ Software Interface; URL:http://booksite.elsevier.com/9780124077263/downloads/advance_contents_and_appendices/appendix_C.pdf ; Jan. 1, 2013; 82 pages.

Yu et al; "A Credit-Based Load-Balance-Aware CTA Scheduling Optimization Scheme in GPGPU"; International Journal of Parallel Programming; vol. 44; No. 1; Aug. 22, 2014; 21 pages.

Fedorov, D.G.: "A new hierarchical parallelization scheme: generalized distributed data interface (GDDI), and an application to the fragment molecular orbital method (FMO)", Journal of computational chemistry. Apr. 30, 2004;25(6):872-80.

Ullman, S.: "Object recognition and segmentation by a fragment-based hierarchy", Trends in cognitive sciences. Feb. 1, 2007; 11 (2):58-64.

MEMORY ALLOCATION FOR 3-D GRAPHICS RENDERING

CROSS-REFERENCE TO RELATED APPLICATIONS AND CLAIM OF PRIORITY

This application is a continuation under 35 U.S.C. 120 of application Ser. No. 18/125,665 filed Mar. 23, 2023, now U.S. Pat. No. 11,934,878, which claims foreign priority under 35 U.S.C. 119 from United Kingdom Application No. 2204511.6 filed Mar. 30, 2022, the contents of which are incorporated by reference herein in their entirety.

BACKGROUND

In computer graphics, "rendering" is the process of converting a 3D model, describing a virtual scene, into one or more 2D images, representing a view of the scene from a specific viewpoint (or viewpoints). As this is a computationally intensive process, for typical virtual scenes, it is common to provide a hardware accelerator that is specialised in carrying out the necessary computations. This kind of hardware accelerator is known in the art as a graphics processing unit (GPU).

Different GPUs may have different hardware architectures, reflecting different strategies for carrying out the computations necessary for 3D rendering. One exemplary GPU uses a "tile-based deferred rendering" (TBDR) pipeline.

This approach separates the rendering process into two distinct stages. The first of these two stages—the geometry processing stage (or simply "geometry processing", for short)—involves processing geometry data that describes the 3-D model of the scene. The geometry data is transformed from the 3-D space into the 2-D coordinates of the image, based on the particular viewpoint to be rendered. The output of this stage is transformed geometry, which is stored in a "parameter buffer" in so-called "primitive blocks". The geometry processing stage is sometimes referred to simply as "geometry processing", for short.

The fundamental operation in the geometry stage is to work out what primitive shapes fall within each tile. The primitives are most commonly triangles. These triangles join together to form objects. The triangles are described in terms of their vertices (corner points). Each vertex includes positional information (the location of the vertex) and can include additional information, for example, colour.

The geometry stage of a rendering operation begins when the GPU receives a draw call from an application driver. The draw call contains instructions for geometry processing tasks (in particular, what triangles to draw) and all of the information needed to carry out the geometry processing.

In the second stage, known as "fragment processing", the transformed geometry data is read from the parameter buffer and rasterised—meaning mapped to pixels. The fragment processing phase converts the primitives into fragments through the rasterisation process. As part of this process, depth-testing is performed to determine what fragments are actually visible at each pixel (or each sample position, if there is not a one-to-one correspondence between sample positions and pixels). "Deferred rendering" refers to the fact that only when the system has determined what fragments are visible does the GPU proceed to run "fragment shader" programs on the visible pixels. The shader program retrieves texture data (containing colour information) for the relevant visible fragments. The pixel shader program determines the pixel values based on the retrieved texture data for the visible fragments.

"Tile-based" refers to the fact that the image to be rendered is subdivided into multiple rectangular blocks, or "tiles". More specifically, in the geometry processing phase, the transformed geometry can be split up, tile by tile, to create a set of tile lists indicating which primitives are present in each tile. The tiles can then be processed by the fragment shading stage substantially independently of one another. Fragment shading is performed for each individual tile, producing pixel (colour) values for the blocks of pixels in that tile.

The tile-based approach facilitates greater data locality. The set of geometry fragments in each tile is typically a small subset of the overall set of fragments. Therefore, the processing can be carried out with a much smaller memory allocation than if the whole image were to be processed in one pass.

Tiling can also facilitate parallel processing to some extent. In particular, because the texturing/shading can be performed independently for different tiles, the fragment shading for different tiles can be allocated to separate GPU cores, in a multicore architecture.

In order to reduce rendering time, it is desirable to process rendering tasks, including both geometry processing and fragment processing tasks, in parallel using a multicore GPU. In order to process a draw call in parallel, the rendering tasks contained within the draw call must be split up into smaller groups of tasks that can be processed on each core of the multicore system.

However, implementing rendering tasks in parallel creates significant new challenges because of the special nature of graphics rendering calculations. In particular, a GPU is required to respect the order in which rendering work is provided by the application driver. This is because, for certain types of graphics content, the final rendered image will depend on the order in which objects are rendered. In other words, if objects are rendered out of sequence, the final rendered image will be incorrect.

This is not a problem for a single rendering pipeline. Work will always exit the pipeline in the same order that it entered the pipeline; there is no danger of completing work out of sequence. However, in a parallel implementation, this inherent ordering is lost. When work is distributed between cores, it is generally not possible to predict accurately how long each piece of work will take each core to complete. When cores are processing, in parallel, work that was originally provided in a defined sequence, there is the possibility that the work will be finished out of the original sequence.

It would be desirable to implement rendering tasks in parallel, on a multicore GPU, in a manner that is efficient and yet also respects the requirement that primitives be rendered in the order that they were provided by the application driver.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and apparatus are provided for allocating memory for geometry processing in a 3-D graphics rendering system comprising multiple cores. Geometry processing work is divided up into discrete work-packages, which form an ordered sequence. Cores are assigned different work-packages to process, and make memory allocation requests to enable them to store the results of the processing. Memory allocation requests relating to the current earliest uncompleted work-package in the sequence are treated differently to other requests, and may be prioritised.

According to an aspect, there is provided a method of allocating memory for geometry processing in a 3-D graphics rendering system comprising multiple cores, the method comprising:
  obtaining information describing a sequence of geometry-processing work-packages distributed among the multiple cores, wherein the information includes, for each work package, an index of the work package in the sequence, and an indication of whether the work package is currently being processed or has been completed;
  identifying the earliest active work-package, being the earliest work-package in the sequence that is currently being processed by any of the cores;
  receiving a request from one of the cores to allocate memory for geometry processing, and
  determining whether to allocate the requested memory based at least in part on whether the request was received from the core processing the earliest active work-package.

The method may comprise allocating the requested memory (or not), according to a result of the determining.

The method may comprise: if the request was received from the core processing the earliest active work-package, allocating the memory; and if the request was received from any other core, restricting the allocation of the memory. Restricting the allocation of the requested memory may comprise imposing additional conditions before the requested memory is allocated.

The restricting may be based at least in part on an amount of memory already allocated to the core.

The restricting may be based at least in part on an amount of unrecoverable memory already allocated to the core, wherein memory is unrecoverable if it stores the output of geometry processing for work-packages subsequent in the sequence to the earliest active work-package.

The method restricting may be based at least in part on the size of a remaining free pool of memory available for the geometry processing.

The restricting may be based on a comparison between the amount of unrecoverable memory already allocated to the core and the size of the remaining free pool of memory.

The restricting may be based on a comparison between the amount of unrecoverable memory already allocated to the core and a fixed threshold.

The restricting may be based on a comparison between the amount of unrecoverable memory already allocated to the core and a dynamic threshold.

The dynamic threshold may be based at least in part on the size of the remaining free pool of memory.

The dynamic threshold may be based at least in part on a minimum operable amount of memory for geometry processing.

The dynamic threshold may be based at least in part on the size of the remaining free pool of memory divided by the number of cores in the system.

The information describing the sequence of geometry-processing work-packages distributed among the multiple cores may be maintained in a register array for each core. The register array may implement a content addressable memory (CAM).

The register array for each core optionally comprises an entry for each work-package assigned to that core, each entry optionally comprising a "valid" flag, a "completed" flag, the index of the work-package, and an indication of the amount of memory currently allocated for that work-package.

The "valid" flag indicates whether the respective entry is in use—in other words, whether it needs to be taken into account for calculating the amount of unrecoverable memory. The "completed" flag indicates whether geometry processing has been completed for the respective work-package.

The method may comprise updating the "completed" flag for an entry when geometry processing is completed for that work-package. The method may comprise updating the "valid" flag for an entry when geometry processing is completed for the earliest active work-package. In particular, when geometry processing is completed for the (current) earliest active work-package, the method may comprise updating the "valid" flag for each entry whose index is lower than the index of the (just completed) earliest active work-package. When geometry processing is completed for the earliest active work-package, the method may comprise updating both the "completed" flag and the "valid" flag for that entry. When geometry processing is completed for the (current) earliest active work-package, the method may further comprise identifying a new earliest active work-package.

When the register array implements a CAM, the CAM may be indexed by the "completed" flag and the "valid" flag. In this way, by querying the CAM, the method can quickly identify those work-packages that are renderable and those work-packages that are not renderable (and whose allocated memory is therefore currently unrecoverable).

Also provided is a core configured to allocate memory for geometry processing in a 3-D graphics rendering system comprising multiple cores, the core comprising a parameter management master unit configured to:
  obtain information describing a sequence of geometry-processing work-packages distributed among the multiple cores, wherein the information includes, for each work package, an index of the work package in the sequence, and an indication of whether the work package is currently being processed or has been completed;
  identify the earliest active work-package, being the earliest work-package in the sequence that is currently being processed by any of the cores;
  receive a request from one of the cores to allocate memory for geometry processing, and
  determine whether to allocate the requested memory based at least in part on whether the request was received from the core processing the earliest active work-package.

The parameter management (PM) master unit may allocate the requested memory to the requesting core according to a result of the determination.

The core may further comprise one or both of: a geometry slave unit, configured to perform geometry processing; and a fragment slave unit, configured to perform fragment processing.

The core may further comprise one or both of: a geometry master unit, configured to distribute geometry-processing work-packages among the multiple cores; and a fragment master unit, configured to distribute fragment-processing work-packages among the multiple cores. The geometry master unit may be configured to distribute geometry-processing work-packages to geometry slave units of the cores. These geometry slave units may include a geometry slave unit of the core in which the geometry master unit resides. The fragment master unit may be configured to distribute fragment-processing work-packages to fragment slave units of the cores. These fragment slave units may include a fragment slave unit of the core in which the fragment master unit resides.

The core requesting the memory allocation may be the same core in which the PM master unit resides, or it may be another core.

The request to allocate memory may be made by a geometry slave unit of the core requesting the memory.

The parameter management master unit may be configured to: allocate the requested memory if the request was received from the core processing the earliest active work-package; and if the request was received from any other core, restrict the allocation of the requested memory.

If the request was received from any core other than the core processing the earliest active work-package, the parameter management master unit may be configured to restrict the allocation of the requested memory based at least in part on an amount of memory, optionally an amount of unrecoverable memory, already allocated to the requesting core.

If the request was received from any core other than the core processing the earliest active work-package, the parameter management master unit may be configured to restrict the allocation of the requested memory based at least in part on a comparison between an amount of memory already allocated to the requesting core and a fixed or dynamic threshold.

The dynamic threshold may be based at least in part on a size of a remaining free pool of memory available for geometry processing.

The core may further comprise a register array for each of the multiple cores, wherein the parameter management master unit is configured to store the information describing the sequence of geometry-processing work-packages in the register arrays.

Thus, for example, if the system comprises three cores doing geometry processing work, the core would comprise three register arrays—one for each of the cores.

For each core, the register array may have an entry for each work-package assigned to that core. Each entry may comprise a "valid" flag, a "completed" flag, the index of the work-package, and an indication of the amount of memory currently allocated for that work-package.

Further provided is a graphics rendering system comprising:
  a first core according to any one of claims 14 to 19;
  at least one second core; and
  a memory;
  wherein the parameter management master unit of the first core is configured to allocate portions of the memory to the at least one second core for geometry processing work.

The parameter management master unit of the first core may also be configured to allocate portions of the memory to the first core for geometry processing work. The memory allocation may be requested, and the geometry processing work may be performed, by a geometry slave unit in each core.

Still further provided is a graphics processing system comprising a core or graphics rendering system as summarised above, and/or configured to perform a method as summarised above. The graphics processing system may be embodied in hardware on an integrated circuit.

Also provided is a method of manufacturing, using an integrated circuit manufacturing system, a graphics processing system as summarised above.

Also provided is a method of manufacturing, using an integrated circuit manufacturing system, a graphics processing system as summarised above, the method comprising: processing, using a layout processing system, a computer readable description of the graphics processing system so as to generate a circuit layout description of an integrated circuit embodying the graphics processing system; and manufacturing, using an integrated circuit generation system, the graphics processing system according to the circuit layout description.

Further provided is computer readable code configured to cause a method as summarised above to be performed when the code is run. The computer readable code may be configured to control a graphics processing system as summarised above to perform the method when the code is run on the graphics processing system. Also provided is a computer readable storage medium (optionally non-transitory) having encoded thereon the computer readable code.

Also provided is an integrated circuit definition dataset that, when processed in an integrated circuit manufacturing system, configures the integrated circuit manufacturing system to manufacture a graphics processing system as summarised above.

Also provided is a computer readable storage medium (optionally non-transitory) having stored thereon a computer readable description of a graphics processing system as summarised above that, when processed in an integrated circuit manufacturing system, causes the integrated circuit manufacturing system to manufacture an integrated circuit embodying the graphics processing system.

Also provided is a computer readable storage medium (optionally non-transitory) having stored thereon a computer readable description of a graphics processing system as summarised above which, when processed in an integrated circuit manufacturing system, causes the integrated circuit manufacturing system to: process, using a layout processing system, the computer readable description of the graphics processing system so as to generate a circuit layout description of an integrated circuit embodying the graphics processing system; and manufacture, using an integrated circuit generation system, the graphics processing system according to the circuit layout description.

Further provided is an integrated circuit manufacturing system configured to manufacture a graphics processing system as summarised above.

Also provided is an integrated circuit manufacturing system comprising: a computer readable storage medium (optionally non-transitory) having stored thereon a computer readable description of a graphics processing system as summarised above; a layout processing system configured to process the computer readable description so as to generate a circuit layout description of an integrated circuit embodying the graphics processing system; and an integrated circuit generation system configured to manufacture the graphics processing system according to the circuit layout description.

The layout processing system may be configured to determine positional information for logical components of a circuit derived from the integrated circuit description so as to generate a circuit layout description of an integrated circuit embodying the graphics processing system.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
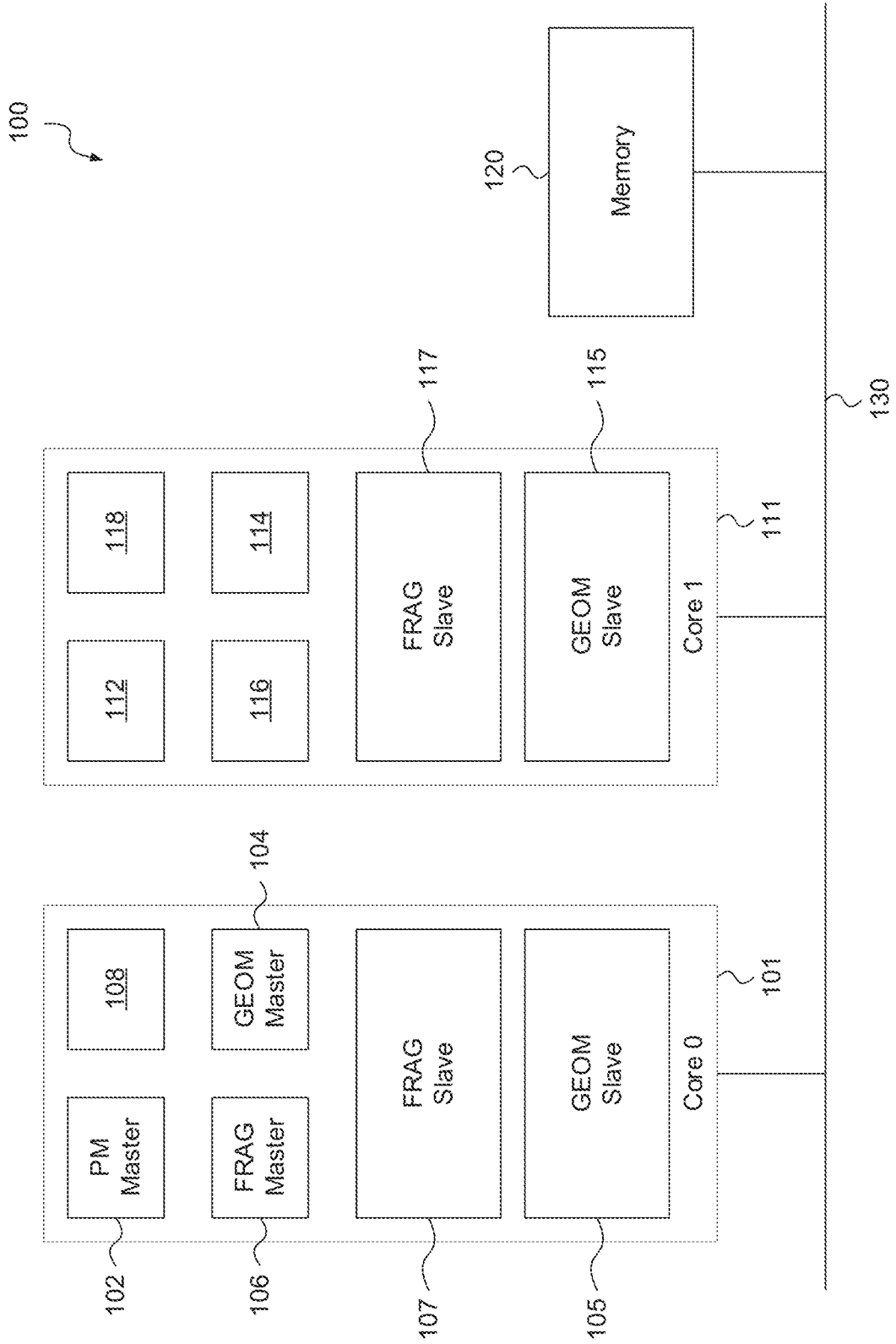
FIG. 1 is a block diagram illustrating a multicore graphics rendering system according to an example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

At first glance, it might seem that the requirement to render primitives in order need not be applied to the geometry processing stage. What matters is the order in which rendering is completed; therefore, in principle, the correct ordering will be respected provided that fragment shading is carried out in the correct sequence.

In practice, however, the requirement to process fragment shading work in a defined sequence also has repercussions for the geometry processing work.

According to one exemplary architecture, an input geometry stream is broken up into pieces of work for parallel processing using "pipeline interleave markers" (PIMs). These are labels that are used to tag each piece of geometry work according to its position in the original stream provided by the application driver. The PIMs will be used in the fragment shading stage to process the primitives in the correct order. It is convenient to refer to each piece of work as simply a "PIM", since each piece corresponds uniquely to one marker. The different PIMs can be allocated to different cores, which then carry out the geometry processing work for the different PIMs independently. Geometry processing of PIMs by a given core produces a set of control streams—one control stream (also known as a "tile control list") per tile.

Fragment shading is also implemented in parallel, typically by allocating different tiles to different cores, as mentioned above.

All of the cores have access to a shared memory, from which they read input data and write output data. The tile control lists produced by the cores during geometry processing form the input for the fragment processing stage.

In the exemplary architecture, memory is allocated to geometry processing work dynamically by a "parameter management" (PM) master unit—so called because it allocates the memory for the parameter buffer. The PM master has a certain free pool of memory that it can allocate to geometry work being performed by different cores. The cores use the allocated memory for writing of control streams and primitive blocks. The maximum size of the free pool will depend on the specification of the particular graphics processing system in question, but it is inevitably finite. In general, it is not possible to predict, before doing the geometry processing, how much memory will be needed to contain the tile control streams and linked primitive block structures associated with a given PIM. This is true even if each PIM contains the same number of primitives. Factors affecting the memory requirements of a PIM may include the coverage of the primitives in tiles, and the complexity of the primitives (in particular, the data associated with each vertex).

The inventors have recognised that problems can arise as the remaining size of the free pool dwindles. In the worst case, the GPU can reach an unrecoverable deadlock state. This problem has its origins in the tension between the parallel processing and the externally imposed constraint on the sequence of rendering operations.

The problem is most easily understood by reference to an example. In a dual core system, let us assume that geometry processing for PIM0, PIM2, PIM5 and PIM6 has been allocated to Core 0, and geometry processing for PIM1, PIM3 and PIM4 has been allocated to Core 1. Each core processes each PIM independently, producing a separate control stream per tile.

Each control stream written by a core for each tile includes PIM markers. These are used to stitch together the PIM sections from multiple control streams for the same tile (one from each core) into a master control stream in PIM order, with all the PIM information removed. Each update to a control stream for a tile contains a link to a primitive block structure, which contains more detailed information about the primitives in terms of their 3D space vertices, and other information required during fragment processing such as uniform and texture values, and state for fixed function processing units. For completeness, it is noted that primitive blocks may contain primitives for different tiles. Each control stream identifies primitives associated with a tile within the primitive block structures in the parameter buffer.

For the fragment shading work, each tile will be allocated to one of the two cores. To process the fragment shading for a given tile, the core (specifically, a fragment shading slave unit within the core) will stitch together two tile control streams—one that was produced by Core 0 and the other that was produced by Core 1. The PIM markers are used to preserve the correct ordering, in this stitching process.

Consider now what might happen if geometry processing work is completed out of sequence. For example, assume that Core 1 has processed PIM1 and is in the middle of processing PIM3. Meanwhile, Core 0 has completed all of its geometry processing work. This means that the parameter buffer contains tile control streams for PIM0, PIM1, PIM2, PIM5 and PIM6 (as well as a partially completed tile control stream for PIM3). Let us assume that the free pool starts to run out as Core 1 continues its processing of PIM3.

One way to recover memory used in the parameter buffer is to perform a "partial render", in which the primitives processed so far are submitted for fragment processing. Once the relevant portions of memory have been read by the cores conducting fragment processing, these portions can be freed, so that they can be reallocated by the PM master for more geometry processing work.

In our example above, the partial render can include PIM0, PIM1, PIM2 and the part of PIM3 whose geometry processing has been completed so far. (Note that the sequence of primitives is preserved within each PIM; therefore, partial rendering of a PIM is possible.) The memory allocated to the rendered PIMs can be freed, and reallocated. Note that PIM5-PIM6 cannot be rendered, because this would break the ordering-constraint—fragment processing for these PIMs must be delayed until after fragment processing for PIM3 (and PIM 4) has been completed. This means that the memory allocated in the parameter buffer for PIM5-PIM6 cannot be freed and reused.

Depending on what subsequent memory allocations are requested by the cores, it is possible that Core 1 will still be unable to complete its geometry processing work for PIM3. For example, assume that, in the meantime, geometry processing work for PIM7, PIM8, and PIM9 has been allocated to Core 0, because that core was idle. If Core 0 is allocated the memory that has been freed as a result of the partial render, in order to continue its geometry processing work, then we may reach a situation where geometry processing has completed for PIM5-PIM9, and the resulting tile control streams are taking up space in the memory, but these PIMs cannot be rendered because Core 1 is still unable to complete PIM3 due to lack of memory. This can lead to deadlock, in which there is no way to free enough memory to "unblock" the pipeline.

Examples according to the present disclosure address this risk of deadlock.

In examples according to the present disclosure, the allocation of memory to each core for geometry processing work depends at least in part on whether that core is processing the lowest active PIM—that is, the PIM having the lowest number of all PIMs currently being processed (and therefore the earliest position in the original geometry sequence). The inventors have recognised that it is always desirable to allocate memory to the processing of the lowest active PIM (PIM3 in our simple example above). On the one hand, this PIM has the potential to "block" the pipeline, if geometry processing cannot be completed for it. On the other hand, it is always safe to allocate additional memory to this PIM, because this memory is always guaranteed to be recoverable by a partial render. By definition, all PIMs earlier in the sequence than the lowest active PIM have been processed already; therefore, all PIMs up to and including the lowest active PIM can be included in a partial render.

Memory can therefore be allocated without restriction to the core currently processing the lowest active PIM.

In examples, according to the present disclosure, if a core is not processing the lowest active PIM, the allocation of memory to that core for geometry processing work is restricted. In particular, the allocation of memory to such a core may be restricted based at least in part on the amount of currently unrecoverable memory that has already been allocated to the core. Here, unrecoverable memory refers to memory associated with tile control streams for PIMs that are currently not renderable. They are unrenderable because they relate to PIMs "above" (that is, later in the sequence than) the lowest active PIM.

The allocation of memory may also be restricted based at least in part on the remaining size of the free pool of memory.

In some examples, the allocation of memory (to cores other than the one processing the lowest active PIM) may be restricted in particular based on a comparison between the unrecoverable memory already allocated to the core and a threshold.

In some examples, the threshold may be a fixed threshold. In other examples, it may be adjusted dynamically. In one example of a dynamic adjustment strategy, the threshold may be set based on the remaining size of the free pool of memory. Optionally, the remaining size may be divided by the number of cores in the system, to give an indication of a "fair" share of memory that can safely be allocated (in an unrecoverable sense) to each core. The threshold may also take into account a minimum operable size of the parameter buffer, to more accurately estimate the amount of usable parameter buffer memory that can safely be allocated to each core.

If the amount of unrecoverable memory allocated to a core exceeds the threshold, the PM master will not allocate any more memory to it, until either its amount of unrenderable (unrecoverable) memory reduces, or the threshold increases.

The PM master allocates memory only to one (currently active) PIM per core. However, memory may have been allocated to previously processed PIMs within a core which cannot yet be rendered (because they are not part of the "renderable range" up to and including the current lowest active PIM).

In the current implementation, in order to support the conditional allocation of memory, the PM master maintains records of the current state of geometry processing in each core, including the amount of unrecoverable memory being used.

The records include, for each PIM allocated to each core: the PIM number, and a flag that indicates whether that PIM has been completed. A "valid" flag indicates whether this entry needs to be taken into account for calculating unrecoverable memory. The records also include the amount of memory currently occupied by the PIM (represented as a page count).

In the current implementation, the PM master maintains the records in a content addressable memory (CAM) for each respective core. Each CAM contains a fixed number of entries, corresponding to the maximum number of PIMs that can be allocated to a core at any given time (a design parameter of the GPU).

When a PIM is allocated to a core, the PM master sets the "valid" flag of the relevant CAM entry. The "completed" flag is initially cleared. Each time a core completes processing of a PIM, the PM master updates the relevant CAM entry to set the "completed" flag. When a PIM has been completed and is determined to be renderable, the "valid" flag is cleared.

Each time the processing of the (current) lowest active PIM is completed, the PM master re-evaluates the status of the other PIMs currently allocated to the cores. Completed PIMs having PIM numbers lower than the new lowest active PIM (and, implicitly, higher than the old lowest active PIM) are invalidated—that is, their "valid" flags are cleared. These PIMs can be rendered by the fragment processing stage (by a partial render, if necessary); therefore, their memory can be recovered if needed. Memory associated with these PIMs is therefore not of any concern.

At any moment in time, the PM master can calculate the amount of unrecoverable memory being used by each core. Unrecoverable memory can be identified by searching the CAM for entries which have their "valid" flags set. These PIMs will have PIM numbers greater than the lowest active PIM (as a consequence of the updating rules mentioned above). In other words, they relate to the (completed and incomplete) PIMs beyond (that is, having PIM numbers above) the current lowest active PIM. When the PM master finds such entries, it retrieves their memory page count from the CAM. The total of these page counts indicates the unrecoverable memory for that core.

The CAM structure represents one quick and efficient way to maintain the records. The CAM entries are indexed by the "valid" and "complete" flags. They return the PIM number and the occupied page count. However, it should be understood that other memory structures could also be used to look up the relevant page count information.

FIG. 1 is a block diagram illustrating a multicore graphics rendering system 100 according to an example. The system 100 comprises two cores, in this example—a first core 101, and a second core 111. It should be understood that the system may include any number of cores, in general. The first core 101 comprises: a parameter management master unit 102; a geometry processing master unit 104; and a fragment shading master unit 106. It may also comprise one or more additional master units 108. The geometry processing master unit 104 is responsible for splitting up, assigning, and distributing geometry processing work packages among the various cores. The fragment shading master unit 106 is responsible for splitting up, assigning, and distributing fragment shading work packages among the various cores. The parameter management master unit 102 is configured to allocate memory for the activities performed by the cores—in particular, to allocate memory for the geometry processing.

The first core 101 further comprises a geometry processing slave unit 105 and a fragment shading slave unit 107. The geometry processing slave unit 105 is configured to perform the share of the geometry processing work that is assigned to the first core 101. The fragment shading slave unit 107 is configured to perform the share of the fragment shading work that is assigned to the first core 101.

According to the present example, the second core 111 is configured similarly to the first core. The cores 101 and 111 are designed and instantiated as identical components because this is more convenient from the perspectives of design and validation, and also because it facilitates scalability. Each core is designed so that it may be instantiated in a given graphics rendering system by itself, or with any number of like cores. The second core 111 therefore comprises a parameter management master unit 112; a geometry processing master unit 114; and a fragment shading master unit 116. However, only one instance of each master unit is needed in the graphics rendering system 100; therefore, only one instance of each master unit is active. In the present example, without loss of generality, it will be assumed that the master units of the first core 101 are active and the master units of the second core 111 are inactive. It should be understood, however, that this is not limiting on the scope of the present disclosure. Any given active master unit may reside in any of the cores in the multicore system.

The second core 111 also comprises a geometry processing slave unit 115 and a fragment shading slave unit 117. It should be understood that both geometry processing slave units 105 and 115 are active, and geometry processing work is divided between them by the geometry processing master unit 104. Likewise, both fragment shading slave units 107 and 117 are active, and fragment processing work is divided between them by the fragment processing master unit 106.

The system 100 further comprises a memory 120, which is shared between the cores 101, 111. The cores 101, 111 and the memory 120 are connected by a bus 130, or other suitable interconnect. The shared access to the memory 120 facilitates the parallel processing, by the cores, of geometry processing and fragment shading. The geometry processing slave units 105 and 115 write control streams and primitive blocks to the memory 120 as they execute the geometry processing. The fragment shading slave units 107 and 117 are then able to read these control streams and primitive blocks, as input for the fragment shading stage. As explained already above, each geometry processing slave unit produces a set of control streams—one control stream per tile. Each fragment shading slave unit is configured to process one tile at a time. A fragment shading slave unit, when processing a given tile, reads the N control streams for that tile (where N is the number of cores, or more specifically the number of cores with active geometry processing slave units). The fragment shading slave unit assembles these individual control streams into a single master control stream for the tile, and executes fragment shading based on this master control stream.

Figure 2A:
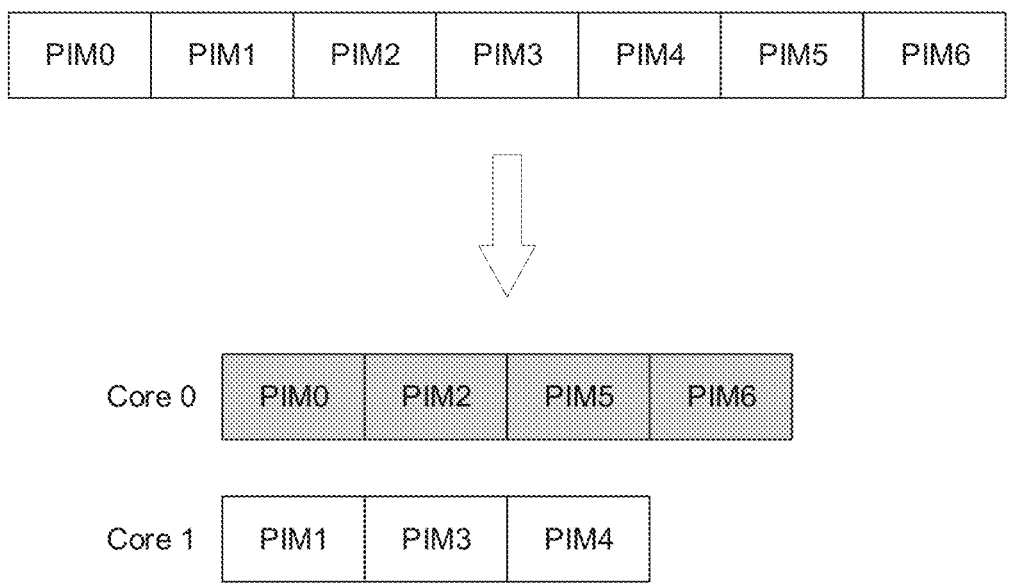
FIG. 2A illustrates a distribution of work packages between two cores.

FIG. 2A illustrates a distribution of work packages between two cores. The contents of a draw call are illustrated as a sequence of blocks. Each of these blocks represents a work-package, and each is identified by its "pipeline interleave marker" (PIM). The PIM is the index of the work-package within the sequence of geometry-processing work-packages. Each work-package consists of a set of primitives requiring geometry processing. The PIM numbers are assigned to the blocks (work-packages) in consecutive increasing order, so that they capture the ordering of the primitives as received from the application driver in the draw call. The ordering of the primitives is also preserved within each block. The geometry processing master unit 104 is responsible for splitting up the draw call into these work-packages and assigning a PIM number to each package. The geometry processing master unit 104 is also responsible for assigning the various work packages to the cores that are available to do geometry processing work. One possible distribution of work packages is shown in FIG. 2A. The geometry processing master unit 104 assigns PIM0, PIM2, PIM5, and PIM 6 to the first core 101 (Core 0) and assigns PIM1, PIM3, and PIM4 to the second core 111 (Core 1). The geometry processing master unit 104 typically tries to split up the geometry processing work such that each core is utilised approximately equally. For example, if the cores are identical and have the same capacity to do work, then the geometry processing master unit 104 would seek to assign the same amount of work to each core. For example, the geometry processing master unit 104 may distribute the geometry processing work such that each core is assigned approximately the same number of primitives to process. However, it is impossible to predict accurately, in advance, how much computational work will be involved in processing a given set of primitives. Therefore, it is almost inevitable that imbalances in the workloads of the different cores will arise (despite the best efforts of the geometry processing master unit 104 to balance these workloads). It is therefore also almost inevitable that the processing of PIMs by the geometry processing slave units 105, 115 will finish out of sequence.

Figure 2B:
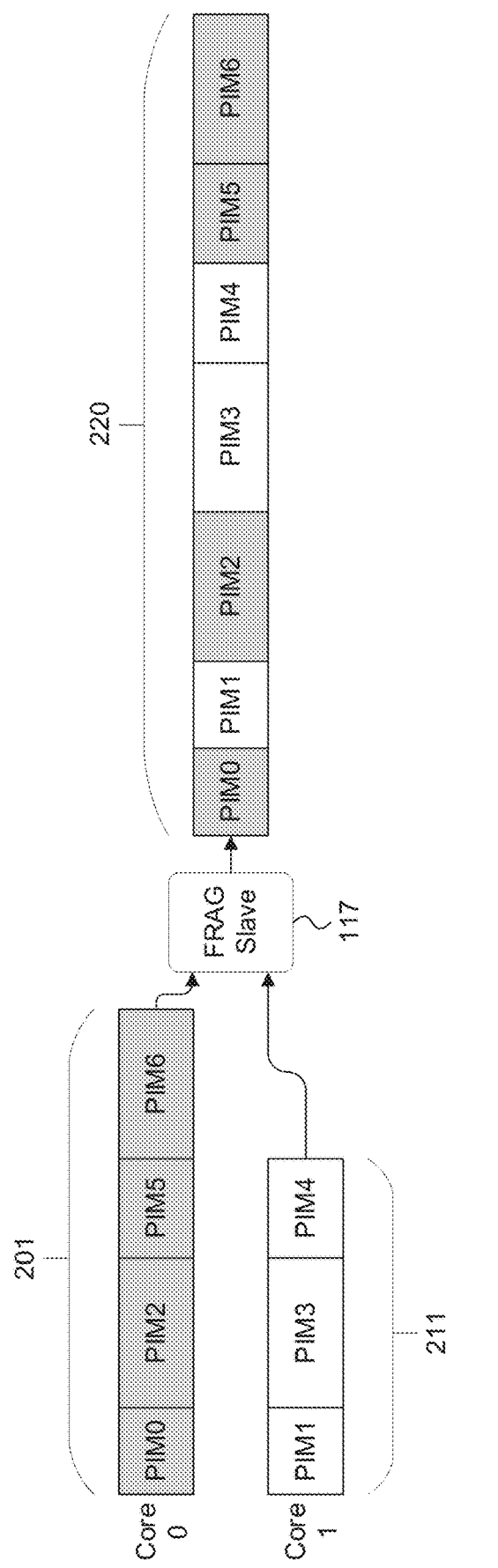
FIG. 2B illustrates the outputs of geometry-processing work-packages being recombined into a control stream for fragment processing.

The PIMs are used to re-impose the original sequence on the primitives. FIG. 2B illustrates the outputs of geometry-processing work-packages being recombined into a master control stream for fragment processing. Let us assume that the fragment shading slave unit 117 has been assigned the task of performing fragment shading for a single tile "Tile (0, 0)" of the frame. The first core 101 (Core 0) provides a first control stream 201 for Tile (0, 0), containing the primitives of PIM0, PIM2, PIM5 and PIM6 that fall within the tile; the second core 111 (Core 1) provides a control stream 211 containing the primitives of PIM1, PIM3 and PIM4 that fall within the tile. Note that the blocks representing the different PIMs are shown in FIG. 2B with varying widths, indicating the variable lengths of time that it takes to process them in the geometry processing stage.

The fragment shading slave unit 117 assembles the two control streams (one from Core 0 and one from Core 1) into a single master control stream 220. It does this by reading PIM markers in each control stream 201, 211 and stitching the PIMs back together in the correct order, according to their PIM numbers. Note that we have assumed that the fragment shading slave unit 117 is processing a single tile purely for the purpose of simplicity. In general, a fragment shading slave unit 107, 117 may be assigned more than one tile at a time to process. If it is assigned more than one tile, the fragment shading slave unit 117 will stitch together respective control streams for each tile, to produce a master control stream for each tile. The splitting up and assignment of fragment shading work to the different fragment shading slave units 107, 117 is handled by the fragment shading master unit 106.

It will be understood from FIG. 2B that, in general, if geometry processing has not been completed for a given PIM, neither that PIM nor any of the PIMs following it in the sequence can be processed in the fragment shading stage. (As mentioned above, there is one exception to this—the part of the lowest active PIM that has been completed so far by the geometry processing stage can be processed in the fragment shading stage, by a partial render.) The master control stream can only be stitched together to the extent that the geometry processing work has been completed. In order to perform geometry processing work, the geometry processing slave units 105, 115 require allocations of memory where they can write the outputs of their work (control stream and associated primitive blocks). In the same way that it is practically impossible to predict the computational complexity of performing geometry processing work for a given PIM, it is also practically impossible to predict the memory requirements for processing that PIM. For this reason, the memory allocation is handled dynamically. As already explained above, the cores 101, 111 share access to the memory 120. In order to share access in the manner required, they need a consistent view of what is stored where. According to the present implementation, this is achieved by providing centralised control of the memory allocations. Each time one of the geometry processing slave units 105, 115 needs additional memory, it requests it from the parameter management master unit 102. The parameter management master unit 102 allocates the memory from an available free stack reserved for geometry processing. When fragment shading is performed, the data written to the memory 120 by the geometry processing slave units 105, 115 is consumed by the fragment shading slave units 107, 117. Once control stream and primitive block data have been consumed during fragment shading, the corresponding memory can be deallocated and returned to the free stack by the parameter management master unit 102.

As outlined already above, a deadlock situation can arise if care is not taken with the allocation of memory to the geometry processing slave units 105, 115. If too much memory has been allocated to store the outputs of geometry processing for PIMs later in the sequence, there might not be enough memory remaining on the free stack to complete geometry processing for an earlier PIM in the sequence. Although a partial render may be triggered, to force fragment shading to be performed for as many primitives as possible, the constraints imposed by the original sequence of primitives mean that this might not offer an adequate solution, sufficient to always avoid deadlock. A partial render can only be performed for a consecutive sequence of primitives for which geometry processing has been completed. For instance, an example was given earlier above in which geometry processing was not complete for PIM3. In this case, a partial render could only be performed for PIM 0, PIM1, PIM2 and the part of PIM3 that had so far been completed.

Without careful control of memory allocation by the parameter management master unit 102, circumstances can arise in which a partial render does not lead to the freeing of sufficient memory to complete geometry processing for an unfinished PIM that is "blocking" the pipeline. Examples according to the present disclosure implement a memory allocation regime that can help to prevent such a deadlock situation arising. This can be achieved, firstly, by distinguishing between the core that is processing the current lowest active PIM and the other cores doing geometry processing work. The "lowest active PIM" is the PIM with the lowest number (index) for which geometry processing is ongoing. By definition, all PIMs with lower indices than the lowest active PIM are already complete. One of the insights of the presently described memory allocation regime is that it is always desirable to allocate memory when it is requested for processing the lowest active PIM. This is because memory allocated to the lowest active PIM can be recovered by triggering a partial render. When cores other than the one processing the lowest active PIM request an allocation of memory, more restrictive conditions are applied before allocating the memory. These more restrictive conditions attempt to strike a balance between a "fair" allocation of memory to each core, to allow it to continue doing geometry processing work, and the need to preserve enough memory on the free stack. By prioritising the allocation of memory to the core processing the lowest active PIM, and by restricting the allocation of memory to the other cores, depending on the remaining size of the free stack, examples according to the present disclosure can reduce the likelihood of a deadlock situation arising.

To implement a memory allocation regime according to an example of the present disclosure, the parameter management master unit 102 maintains records of the memory allocated so far for processing each PIM, as well as records of the current processing status of each PIM. In particular, according to the example described below, the parameter management master unit 102 maintains records that allow it to determine, at any given time, the amount of unrecoverable memory currently allocated to a core. Here, "unrecoverable"

refers to allocated memory that cannot be recovered by triggering a partial render. The records kept according to this example will be described with reference to FIGS. 3A-3C.

Figure 3A:
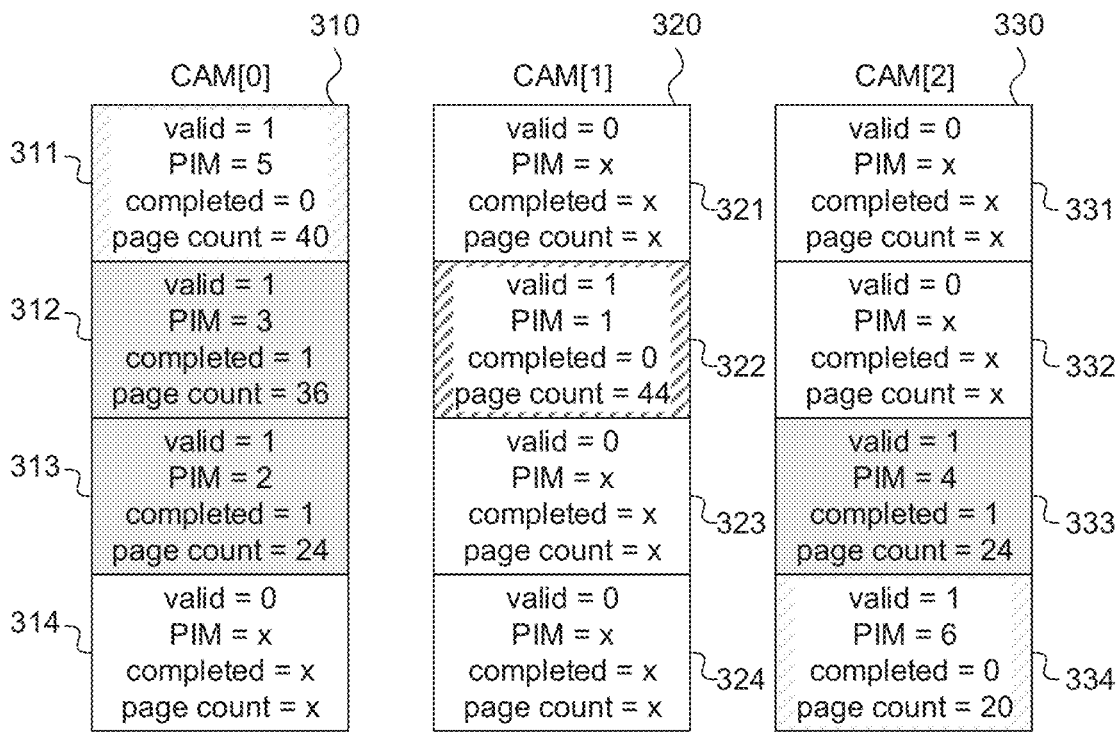
FIGS. 3A-3C illustrate the contents of a content addressable memory during the execution of a method according to an example.
Figure 3B:
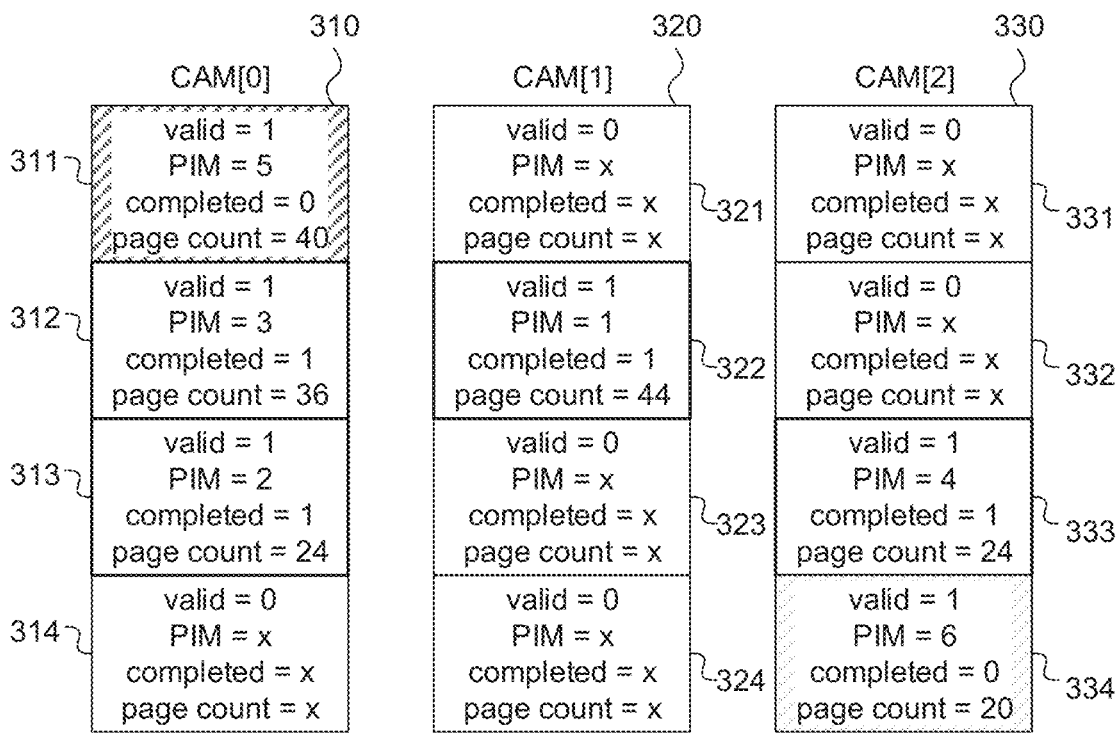
Figure 3C:
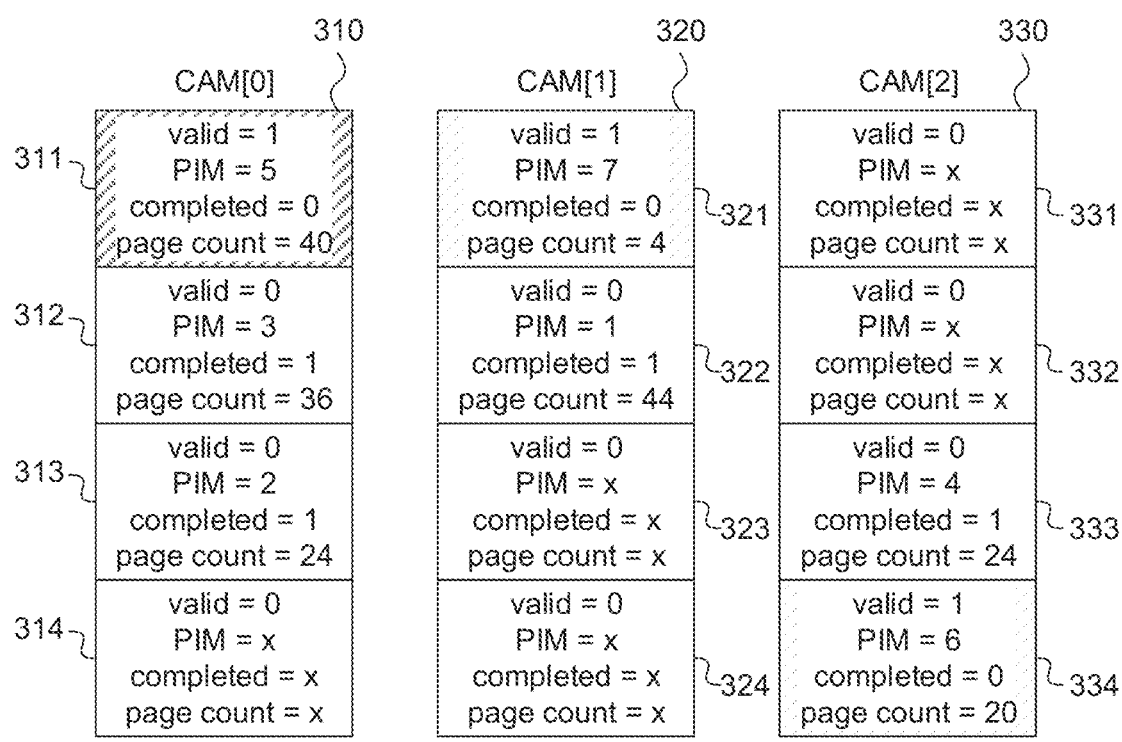

FIGS. 3A-3C illustrate the contents of a set of register arrays 310, 320, 330 during the execution of a method according to an example. As indicated in the drawings, in this example, each register array implements a content addressable memory (CAM); however, this is not essential in all examples. In general, any register array whose contents can be examined, by any suitable means, can be used by the parameter management master unit 102 to store the desired memory-allocation records. References to the CAMs in the following description should be understood in this context.

The example of FIGS. 3A-3C is a different and slightly more elaborate example than the example in FIGS. 2A and 2B. In the example of FIGS. 3A-3C, there are three cores performing geometry processing. The parameter management master unit maintains a respective CAM (register array) for each of these cores. The size of each CAM depends on the maximum number of PIMs that can be allocated to each core concurrently. In the present example, it is assumed that up to four PIMs may be allocated to each core (that is, to each geometry processing slave unit) at any given time, by the geometry processing master unit. Consequently, each CAM has four entries. The CAM 310 maintaining the records for Core 0 has entries 311, 312, 313, and 314. The CAM 320 maintaining the records for Core 1 has entries 321, 322, 323, and 324. Likewise, the CAM 330 maintaining the records for Core 2 has entries 331, 332, 333, and 334. Each entry contains a "valid" flag; a PIM number; a "completed" flag; and a page count. The "completed" flag indicates whether geometry processing has already been completed for the PIM. The "valid" flag indicates whether the entry needs to be taken into account for calculating unrecoverable memory. The page count is the amount of memory (in units of pages) currently allocated to the PIM to which the entry pertains. The PIM number indicates the PIM to which the entry pertains.

Each core processes the PIMs that it has been assigned in the order of their PIM numbers. Each core only processes one PIM at time and therefore only requests memory allocations for one PIM at a time.

In the state illustrated in FIG. 3A, six PIMs have been distributed to the cores for geometry processing. Core 0 has been assigned PIMs 2, 3, and 5; Core 1 has been assigned PIM 1; and Core 2 has been assigned PIMs 4 and 6. The memory currently allocated to each of PIMs 1-6 is recorded in a respective entry 322, 313, 312, 333, 311 and 334 in one of the CAMs 310, 32, 330. The "valid" bits (flags) are set (valid=1) for each of these entries. The remaining entries are not currently in use and their "valid" bits are cleared (valid=0). Geometry processing has already completed for PIMs 2, 3, and 4. The "completed" bits (flags) of the respective entries are therefore set (completed=1). Core 0 is currently processing PIM 5; Core 1 is currently processing PIM 1; and Core 2 is currently processing PIM 6. The "completed" bits for the respective entries are therefore cleared (completed=0). The lowest active PIM is PIM 1. From these records, it can be deduced that: Core 0 has two completed but not renderable PIMs (PIMs 2 and 3); Core 1 is processing the lowest active PIM; and Core 2 has one completed but not renderable PIM (PIM 4). The amount of unrecoverable memory allocated to each core is indicated by the total unrenderable page count for that core. Core 0 has a total unrenderable page count of 100 pages. This is the sum of the page counts in entries 311, 312 and 313. Core 0 has a total unrenderable page count of 0, because it is processing the lowest active PIM—the 44 pages currently allocated to this PIM will be recoverable in a partial render. Core 2 has a total unrenderable page count of 44—the sum of the page counts of entries 333 and 334. Entry 333 relates to PIM 4, which has been completed but cannot yet be rendered because its PIM number is higher than the lowest active PIM. Entry 334 relates to PIM 6, which is currently being processed, and cannot yet be rendered for the same reason.

FIG. 3B illustrates the situation when Core 1 finishes processing PIM 1. The "completed" flag of the associated entry 322 is set (completed=1). As a result of the completion of geometry processing for PIM 1, the status of several other PIMs changes. PIMs 1, 2, 3, and 4 are now all renderable. The new lowest active PIM is PIM 5, which is (still) being processed by Core 0. Core 2 continues to process PIM 6. In response to the completion of geometry processing for PIM 1, the parameter management master unit 102 updates the CAM entries as shown in FIG. 3C. As PIMs 1-4 are renderable, the "valid" flags of the respective CAM entries 322, 313, 312 and 333 are cleared (valid=0). The memory allocated for these PIMs is still occupied, but it is now recoverable (via a partial render), and therefore no longer needs to be tracked for the purposes of calculating unrecoverable memory. This means that the total amount of unrecoverable memory has reduced. In particular, the amount of unrecoverable memory associated with Core 1 has decreased from 100 pages to 0 pages. Consequently, when the geometry processing master unit assigns the next PIM (PIM 7) to Core 1, and the geometry processing slave unit of Core 1 requests a memory allocation for this geometry processing, the parameter management master unit responds by allocating the requested 4 pages of memory. Core 1 begins the geometry processing for PIM 7, accordingly.

Note that, after the "valid" flag is cleared for each entry (once the corresponding PIM becomes renderable), the entry remains in the register array. Entries whose "valid" flags have been cleared are available for reuse. An entry with valid=0 will be overwritten when a new PIM arrives at the PM master unit 102. In this way, the CAM entries may be reused multiple times during the processing of a geometry phase. This may be beneficial, because the number of PIMs in a geometry processing phase may be many more than the number of entries that the PM master unit is configured to support. Note that there is no need to explicitly delete or clear the contents of the CAM—it is sufficient to clear the "valid" flag to mark them for reuse. This helps to minimise power consumption. Entries with valid=0 are considered invalid and will not be read. By the end of the geometry phase, all PIMs should have become renderable; therefore, all of the CAM entries should show valid=0 and completed=1.

Figure 4:
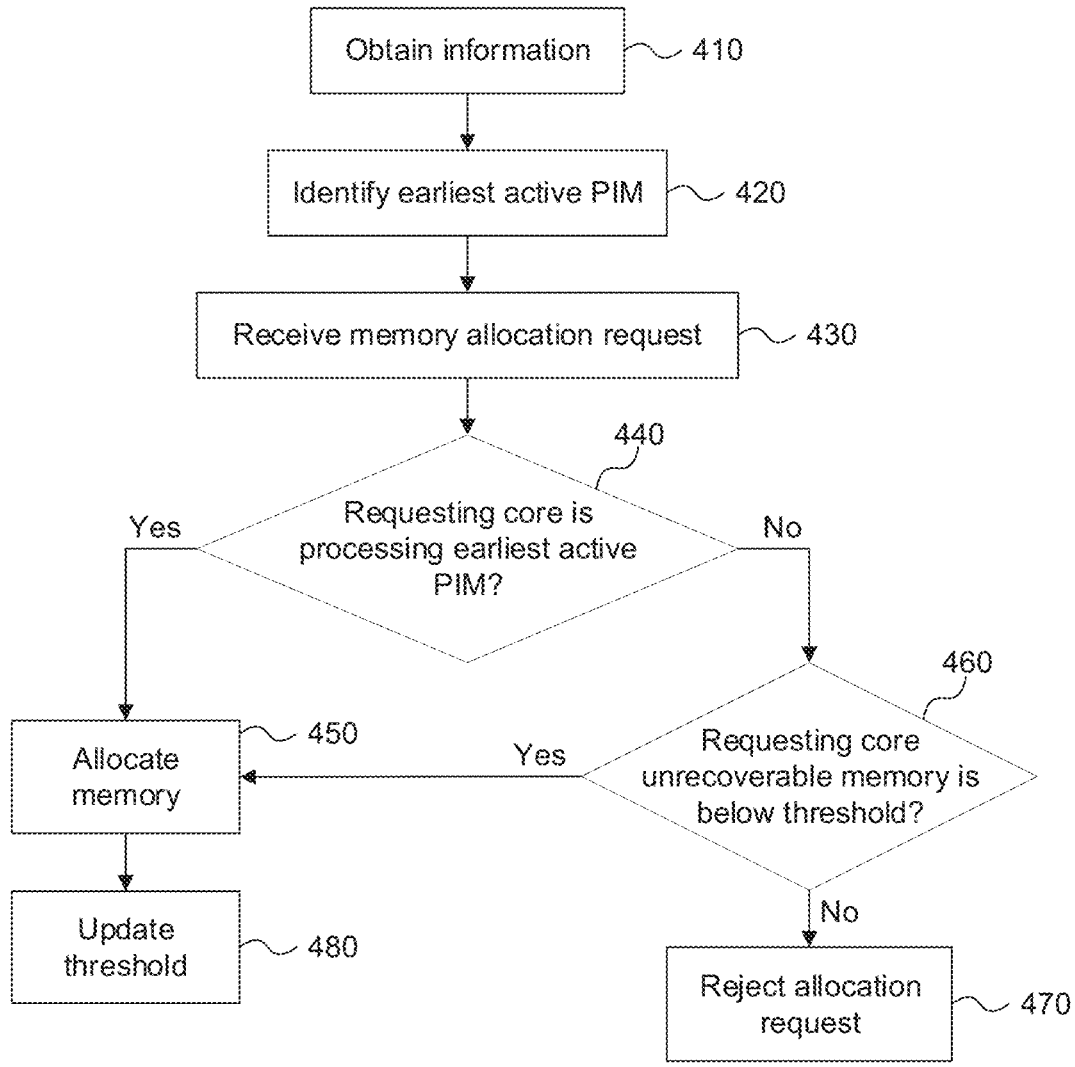
FIG. 4 is a flowchart illustrating a method of allocating memory according to an example.

FIG. 4 is a flowchart illustrating a method of allocating memory, performed by the parameter management master unit 102, according to an example. We will refer again to the dual-core example of FIG. 1, in describing this method. In step 410, the master unit 102 obtains information describing the geometry processing work packages distributed between the cores 101, 111. This step involves populating register arrays, (CAMs) like those shown in FIG. 3, with information about the assignment of PIMs to cores, along with information about the number of memory pages currently allocated for processing each PIM. In step 420, the master unit 102 identifies the lowest active PIM and the core processing it. In step 430, the master unit 102 receives a request for memory allocation from the geometry processing slave unit 105, 115 of one of the cores 101, 111.

The master unit 102 determines whether or not to allocate the requested memory based on whether the request came from the core processing the lowest active PIM. If the master unit 102 determines, in step 440, that the core requesting the memory allocation is currently processing the lowest active PIM, then it allocates the memory without any restriction (in step 450). That is, the master unit 102 allocates the memory in this case without applying any further conditions. If the master unit 102 determines, in step 440, that the request was made by a core other than the core processing the lowest active PIM, there is a restriction on the allocation of the memory. That is, the master unit 102 evaluates further conditions before potentially allocating the requested memory. In particular, in the present example, the master unit calculates the total amount of unrecoverable memory currently allocated to the requesting core. It does this using the contents of the register arrays, as explained above for the example of FIGS. 3A-3C. If the unrecoverable memory currently allocated to the requesting core is below a threshold (see step 460), the master unit 102 allocates the memory (step 450). Otherwise, it rejects the memory allocation request (step 470).

The threshold applied to the unrecoverable memory allocation in step 460 may be determined in a variety of ways. In the present example, the threshold is calculated based on the current available remaining size of the free stack, using the following formula:

$$\text{suspend\_threshold} = \frac{\text{free\_stack\_size} - \text{minimum\_parameter\_buffer\_size}}{\text{number\_of\_cores}}$$

The "free stack size", as the name suggests, is the remaining size of the free stack that the parameter management master unit 102 has available to allocate to the parameter buffer. As memory is allocated to the parameter buffer, the free stack size reduces. The "minimum parameter buffer size" represents an amount of memory that should be kept in reserve in all circumstances, to enable the graphics rendering system 100 to continue functioning correctly. It may account for the memory requirements to successfully carry out a partial render, for example. The minimum parameter buffer size typically depends on configuration parameters of the system, such as the number of cores and the number of processing units per core. The threshold for suspending further memory allocations is equal to the difference between the free stack size and the minimum parameter buffer size, divided by the number of cores in the multicore system. This is intended to allow each core to monopolise a "fair" (that is equitable) number of unrecoverable memory pages. If a core has more unrecoverable memory pages than this threshold, any further memory allocation requests by that core will be rejected by the parameter management master unit 102.

Note that the threshold is dynamic; therefore, a core can exceed the threshold in two ways, in general: either by the parameter management master unit 102 allocating more memory to it (in step 450), or by the threshold decreasing. The threshold decreases whenever memory is allocated by the master unit 102 to any of the cores 101, 111 for geometry processing, since this reduces the remaining free stack size. This is reflected by step 480 in the method of FIG. 4: after memory has been allocated (in step 450), the method proceeds to step 480, in which the master unit 102 updates the suspend-threshold based on the new value of the free stack size.

Of course, the suspend-threshold can also increase. This may happen either (i) through the memory being deallocated and released back to the free stack, after the data occupying it has been consumed by the fragment shading slave units 107, 117, in the fragment processing stage, or (ii) by additional memory being allocated by the system to the free stack. These steps are not reflected in the flowchart of FIG. 4, for simplicity.

Figure 5:
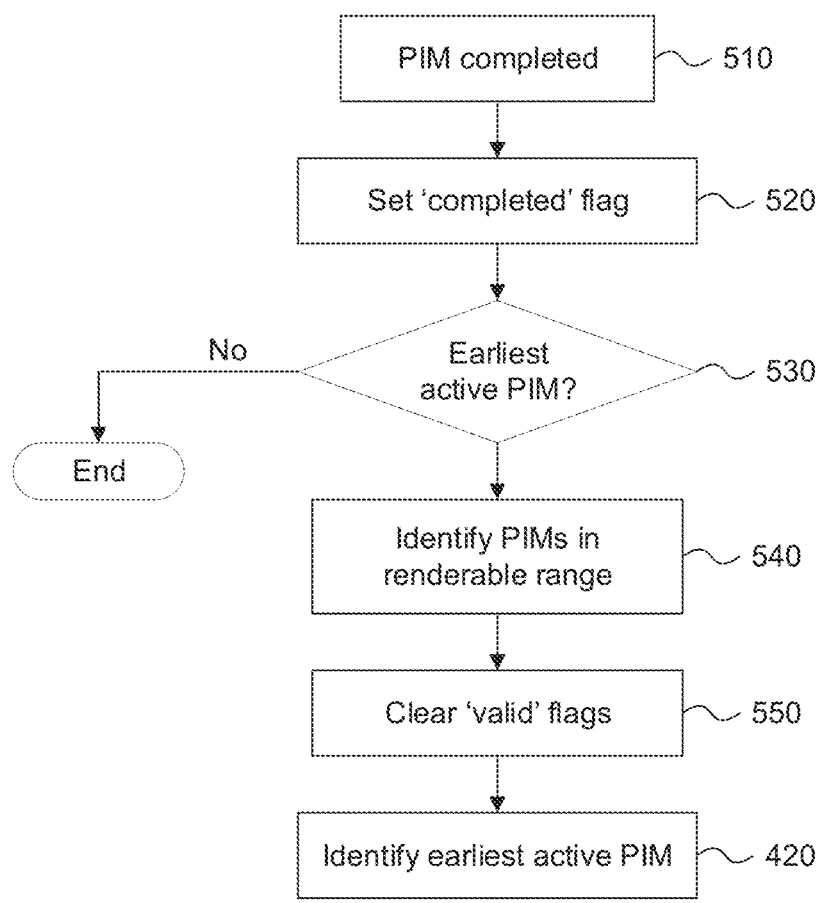
FIG. 5 is a flowchart illustrating a method of updating information that describes geometry-processing work-packages distributed among cores.

FIG. 5 is a flowchart illustrating a method of updating the records stored in the register arrays (CAMs) shown in the example of FIGS. 3A-3C. As explained above, these records store the information that describes how the geometry-processing work-packages are distributed among the cores, and what memory has been allocated to them. In step 510, one of the geometry processing slave units 105, 115 finishes processing a PIM. In response, in step 520, the parameter management master unit 102 sets the "completed" flag in the respective register array entry for that PIM. Next, in step 530, the master unit 102 checks whether the newly completed PIM was the lowest active PIM. If not, no further updating of the records is required and the method terminates. If the newly completed PIM was the lowest active PIM, further updates are required. In step 540, the master unit 102 identifies PIMs that are now in the renderable range (as a result of completion of the lowest active PIM). These PIMs are identifiable by virtue of having PIM numbers lower than the lowest active PIM. The master unit 102 clears the "valid" flags for these (now) renderable PIMs (step 550), because the memory allocated to them is no longer unrecoverable. After step 550, the master unit 102 proceeds to step 420, in which it identifies the new lowest active PIM.

It should be understood that the examples described above, with reference to FIGS. 1 to 5, are exemplary—the scope of the present disclosure is not limited to these examples.

For instance, the allocation of memory to the cores for geometry processing need not be recorded in a memory structure identical to that illustrated in FIG. 3A-3C. Those skilled in the art will be able to design suitable alternative structures for storing this information, based on the description above.

Similarly, the dynamically adaptive suspension threshold described above (for restricting memory allocation to cores other than the core processing the lowest active PIM) may be replaced or augmented with another threshold. In some examples, a fixed threshold may be defined—for instance, chosen such that the aggregate unrecoverable memory allocated to the cores does not exceed some nominal "safe" proportion of the total amount of memory allocated by the system for the parameter buffer. Provided such a fixed threshold is chosen conservatively, it may still be able to avoid deadlock situations, by ensuring there is sufficient memory available (either free or recoverable) that the system can escape from deadlock by performing a partial render. In other examples, a dynamic threshold may be used which is different from the one described in the example above.

In some examples, the system may allow the application driver the ability to override the memory allocation mechanism. If overridden by the application driver, the parameter management master unit may allocate memory as requested by the cores, without restriction. Overriding by the application driver may be appropriate if the application is taking responsibility for any deadlock situations that may arise.

In the examples above, the amount of memory allocated for the outputs of geometry processing was measured in units of pages. This was beneficial because the allocation of memory in those examples was quantised in terms of pages. Therefore, the granularity of the measurement matched the granularity of the memory allocations. Nevertheless, those skilled in the art will appreciate that any other suitable unit of memory size (such as bits, bytes, kilobytes, or megabytes) may be used instead of counting pages.

In the examples above, reference was made to the "lowest" active PIM—this being the active PIM having the earliest position in the original geometry sequence. In this regard, it should be understood that the term "lowest" is not limiting. Labelling the earliest active PIM as the "lowest" one depends on numbering with successively increasing PIM numbers. In an alternative implementation, the PIM numbers could be assigned such that they follow a decreasing sequence. In this alternative implementation, the earliest active PIM would be the "highest" active PIM. The preceding (completed) PIMs would have higher PIM numbers; the subsequent PIMs would have lower PIM numbers.

Figure 6:
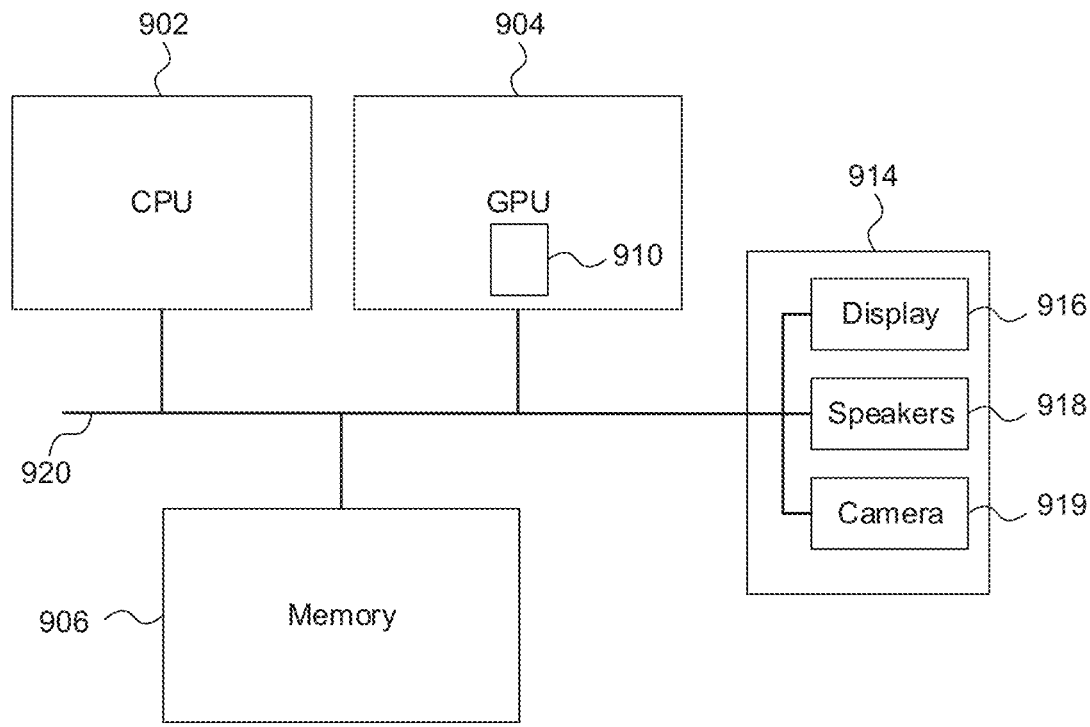
FIG. 6 shows a computer system in which a graphics processing system is implemented.

A core 101, or a 3-D graphics rendering system 100, as described above may be implemented as part of a graphics processing system. FIG. 6 shows a computer system in which such a graphics processing system may be implemented. The computer system comprises a CPU 902, a GPU 904, a memory 906 and other devices 914, such as a display 916, speakers 918 and a camera 919. A processing block 910 (corresponding to the cores 101 and 111, and bus/interconnect 130) is implemented on the GPU 904. In other examples, the processing block 910 may be implemented on the CPU 902. The components of the computer system can communicate with each other via a communications bus 920. A store 912 (corresponding to memory 120) is implemented as part of the memory 906.

While FIG. 6 illustrates one implementation of a graphics processing system, it will be understood that a similar block diagram could be drawn for an artificial intelligence accelerator system—for example, by replacing either the CPU 902 or the GPU 904 with a Neural Network Accelerator (NNA), or by adding the NNA as an additional unit. In such cases, the processing block 910 can be implemented in the NNA.

The cores 101, 111 and graphics rendering system 100 of FIG. 1 are shown as comprising a number of functional blocks. This is schematic only and is not intended to define a strict division between different logic elements of such entities. Each functional block may be provided in any suitable manner. It is to be understood that intermediate values described herein as being formed by a core or graphics rendering system need not be physically generated by the core or graphics rendering system at any point and may merely represent logical values which conveniently describe the processing performed by the core or graphics rendering system between its input and output.

The cores and graphics rendering systems described herein may be embodied in hardware on an integrated circuit. The cores and graphics rendering systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java® or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a core, graphics rendering system, or graphics processing system configured to perform any of the methods described herein, or to manufacture a core, graphics rendering system, or graphics processing system comprising any apparatus described herein. An integrated circuit definition dataset may be, for example, an integrated circuit description.

Therefore, there may be provided a method of manufacturing, at an integrated circuit manufacturing system, a core, graphics rendering system, or graphics processing system as described herein. Furthermore, there may be provided an integrated circuit definition dataset that, when processed in an integrated circuit manufacturing system, causes the method of manufacturing a core, graphics rendering system, or graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a core, graphics rendering system, or graphics processing system will now be described with respect to FIG. 7.

Figure 7:
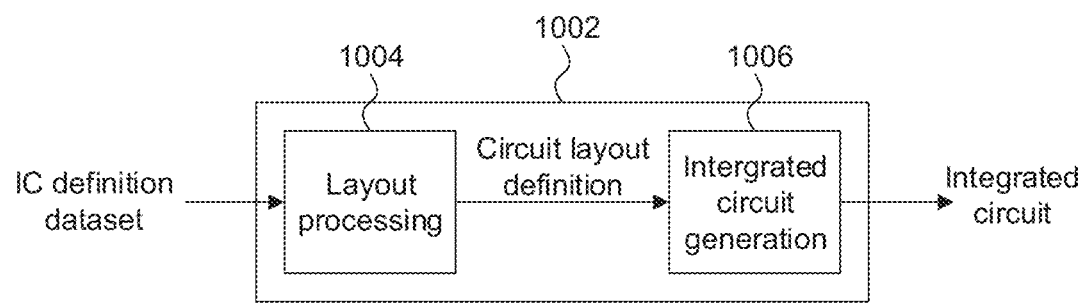
FIG. 7 shows an integrated circuit manufacturing system for generating an integrated circuit embodying a graphics processing system.

FIG. 7 shows an example of an integrated circuit (IC) manufacturing system 1002 which is configured to manufacture a core, graphics rendering system, or graphics processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a core, graphics rendering system, or graphics processing system as described in any of the examples herein), process the IC definition dataset, and generate an IC according to the IC definition dataset (e.g. which embodies a core, graphics rendering system, or graphics processing system as described in any of the examples herein). The processing of the IC definition dataset configures the IC manufacturing system 1002 to manufacture an integrated circuit embodying a core, graphics rendering system, or graphics processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a core, graphics rendering system, or graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of allocating memory in a 3-D graphics rendering system comprising multiple cores, the method comprising:
    obtaining information describing a sequence of work-packages distributed among the multiple cores, wherein the information includes, for each work package, an index of the work package in the sequence, and an indication of whether the work package is currently being processed or has been completed;
    receiving a request from one of the cores to allocate memory;
    determining whether to allocate the requested memory based at least in part on whether the request was received from the core processing the earliest work-package in the sequence that is currently being processed by any of the cores; and
    allocating memory to said one of the cores in response to said request, in dependence on said determining.

2. The method of claim 1, further comprising:
    if the request was received from the core processing said earliest work-package, allocating the memory; and
    if the request was received from any other core, restricting the allocation of the memory.

3. The method of claim 2, wherein the restricting is based at least in part on an amount of memory already allocated to the core.

4. The method of claim 3, wherein the restricting is based at least in part on an amount of unrecoverable memory already allocated to the core, wherein memory is unrecoverable if it stores output for work-packages subsequent in the sequence to said earliest work-package.

5. The method of claim 2, wherein the restricting is based at least in part on the size of a remaining free pool of memory available.

6. The method of claim 5, wherein the restricting is based on a comparison between the amount of unrecoverable memory already allocated to the core and the size of the remaining free pool of memory.

7. The method of claim 2, wherein the restricting is based on a comparison between the amount of unrecoverable memory already allocated to the core and a fixed threshold.

8. The method of claim 2, wherein the restricting is based on a comparison between the amount of unrecoverable memory already allocated to the core and a dynamic threshold.

9. The method of claim 8, wherein the dynamic threshold is based at least in part on the size of the remaining free pool of memory.

10. The method of claim 8, wherein the dynamic threshold is based at least in part on a minimum operable amount of memory.

11. The method of claim 8, wherein the dynamic threshold is based at least in part on the size of the remaining free pool of memory divided by the number of cores in the system.

12. The method of claim 1, wherein the information describing the sequence of work-packages distributed among the multiple cores is maintained in a register array for each core.

13. The method of claim 12, wherein the register array for each core comprises an entry for each work-package assigned to that core, each entry comprising a "valid" flag, a "completed" flag, the index of the work-package, and an indication of the amount of memory currently allocated for that work-package.

14. A core configured to allocate memory in a 3-D graphics rendering system comprising multiple cores, the core comprising a master unit configured to:
    obtain information describing a sequence of work-packages distributed among the multiple cores, wherein the information includes, for each work package, an index of the work package in the sequence, and an indication of whether the work package is currently being processed or has been completed;
    receive a request from one of the cores to allocate memory;
    determine whether to allocate the requested memory based at least in part on whether the request was received from the core processing the earliest work-package in the sequence that is currently being processed by any of the cores; and
    allocate memory to said one of the cores in response to said request, in dependence on said determining.

15. The core of claim 14, wherein the master unit is further configured to:
    allocate the requested memory if the request was received from the core processing said earliest work-package; and
    if the request was received from any other core, restrict the allocation of the requested memory.

16. A graphics rendering system comprising:
    a first core as set forth in claim 14;
    at least one second core; and
    a memory;
    wherein the master unit of the first core is configured to allocate portions of the memory to the at least one second core.

17. A graphics processing system comprising the core as set forth in claim 14, and configured to:
    obtain information describing a sequence of work-packages distributed among the multiple cores, wherein the information includes, for each work package, an index of the work package in the sequence, and an indication of whether the work package is currently being processed or has been completed;
    receive a request from one of the cores to allocate memory; and
    determine whether to allocate the requested memory based at least in part on whether the request was received from the core processing the earliest work-package in the sequence that is currently being processed by any of the cores.

18. A method of manufacturing a graphics processing system as set forth in claim 17 comprising inputting to an integrated circuit manufacturing system an integrated circuit definition dataset that, when processed in said integrated circuit manufacturing system, configures the integrated circuit manufacturing system to manufacture said graphics processing system.

19. A non-transitory computer readable storage medium having stored thereon executable code configured to cause the method as set forth in claim 1 to be performed when the code is run.

20. A non-transitory computer readable storage medium having stored thereon an integrated circuit definition dataset that, when processed in an integrated circuit manufacturing system, configures the integrated circuit manufacturing system to manufacture a graphics processing system as set forth in claim 17.

* * * * *